(12) United States Patent
Nakamura et al.

(10) Patent No.: US 9,929,620 B2
(45) Date of Patent: Mar. 27, 2018

(54) MOTOR

(71) Applicant: Nidec Corporation, Kyoto (JP)

(72) Inventors: Yoshinobu Nakamura, Kyoto (JP); Masato Nakanishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 345 days.

(21) Appl. No.: 14/918,744

(22) Filed: Oct. 21, 2015

(65) Prior Publication Data

US 2016/0233737 A1 Aug. 11, 2016

(30) Foreign Application Priority Data

Nov. 12, 2014 (JP) ................................. 2014-229934
Jul. 30, 2015 (JP) ................................. 2015-150692

(51) Int. Cl.
 *H02K 11/00* (2016.01)
 *H02K 5/22* (2006.01)
 *H02K 11/215* (2016.01)
 *H02K 9/19* (2006.01)
 *H02K 11/33* (2016.01)

(52) U.S. Cl.
 CPC ............... *H02K 5/225* (2013.01); *H02K 9/19* (2013.01); *H02K 11/215* (2016.01); *H02K 11/33* (2016.01)

(58) Field of Classification Search
 CPC .................. H02K 5/225; H02K 11/33; H02K 11/21–11/28
 USPC .................................................. 310/68 R, 71
 See application file for complete search history.

(56) References Cited

U.S. PATENT DOCUMENTS

| | | | |
|---|---|---|---|
| 8,471,418 B2 | 6/2013 | Yamasaki | |
| 8,564,161 B1 | 10/2013 | Yamasaki | |
| 2008/0211357 A1 | 9/2008 | Kataoka et al. | |
| 2011/0254388 A1 | 10/2011 | Yamasaki | |
| 2013/0257194 A1 | 10/2013 | Yamasaki | |
| 2016/0233737 A1 | 8/2016 | Nakamura et al. | |

FOREIGN PATENT DOCUMENTS

| | | |
|---|---|---|
| JP | 2010-051131 A | 3/2010 |
| JP | 5563513 B2 | 7/2014 |
| JP | 2014-169079 A | 9/2014 |

*Primary Examiner* — Ramon M Barrera
(74) *Attorney, Agent, or Firm* — Keating & Bennett, LLP

(57) ABSTRACT

An object of the present invention is to provide a motor which has a maintenance port and of which the wire is insusceptible to disturbance noise. The motor includes: a bracket housing a rotor and a stator; a control device housing part located on the radial direction outside of the bracket; a control device located inside the control device housing part; a sensor housing part located at the end of the bracket on the side opposite to an output end; a motor sensor mounted at the end of a rotating shaft on the side opposite to the output end; and a coupling connector connecting the motor sensor and the control device with each other. The control device housing part and the sensor housing part communicate with each other. The coupling connector is located inside the sensor housing part. The sensor housing part has a port which has an opening in the axial direction, and the port and the coupling connector at least partially overlap with each other in the axial direction.

16 Claims, 10 Drawing Sheets

MOTOR

BACKGROUND OF THE INVENTION

1. Field of the Invention

The present invention relates to a motor.

2. Description of the Related Art

In recent years, motor configurations have been proposed in which a motor and a control device driving the motor are integrated to reduce the size of the entire motor including the control device. In this case, it is conceivable to wire a connector, which connects the motor and the control device with each other, inside the integrated motor structure. In the case where the wire is installed inside the integrated motor structure, the motor is provided with a work window for maintenance of the motor and the control device. For example, an electric power steering device disclosed in Japanese Patent No. 5563513 has a configuration in which a control circuit housing for housing a control circuit is mounted on an electric motor, and a work window is formed in a circumferential wall of the control circuit housing.

In the motor described in the above patent literature, since the work window is provided in the circumferential wall of the control circuit housing, it is necessary to route the wire, which connects a rotational position sensor and the control circuit with each other, from the vicinity of a motor rotating shaft to the circumferential wall. The longer the wire, the more susceptible the current, signals, etc. inside the wire are to disturbance noise, which may degrade the accuracy of the rotational position sensor.

An object of one aspect of the present invention is to provide a motor which has a maintenance port and of which the wire is insusceptible to disturbance noise.

SUMMARY OF THE INVENTION

According to one aspect of the present invention, there is provided a motor including: a rotating shaft extending in a central axial direction and having one end serving as an output end; a rotor in which the rotating shaft is fixed; a stator located radially outside of the rotor; a bracket housing the rotor and the stator; a control device housing part located radially outside of the bracket; a control device located inside the control device housing part; a sensor housing part located at the end of the bracket on the side opposite to the output end; a motor sensor mounted at the end of the rotating shaft on the side opposite to the output end; and a coupling connector connecting the motor sensor and the control device with each other. The internal space of the control device housing part and the internal space of the sensor housing part communicate with each other. The coupling connector is located inside the sensor housing part. The sensor housing part has a port which has an opening in the axial direction. The port and the coupling connector at least partially overlap with each other in the axial direction.

According to one preferable aspect of the present invention, it is easy for a worker etc. to perform maintenance work conveniently. Moreover, it is possible to provide a motor of which the internal wire is insusceptible to disturbance noise.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
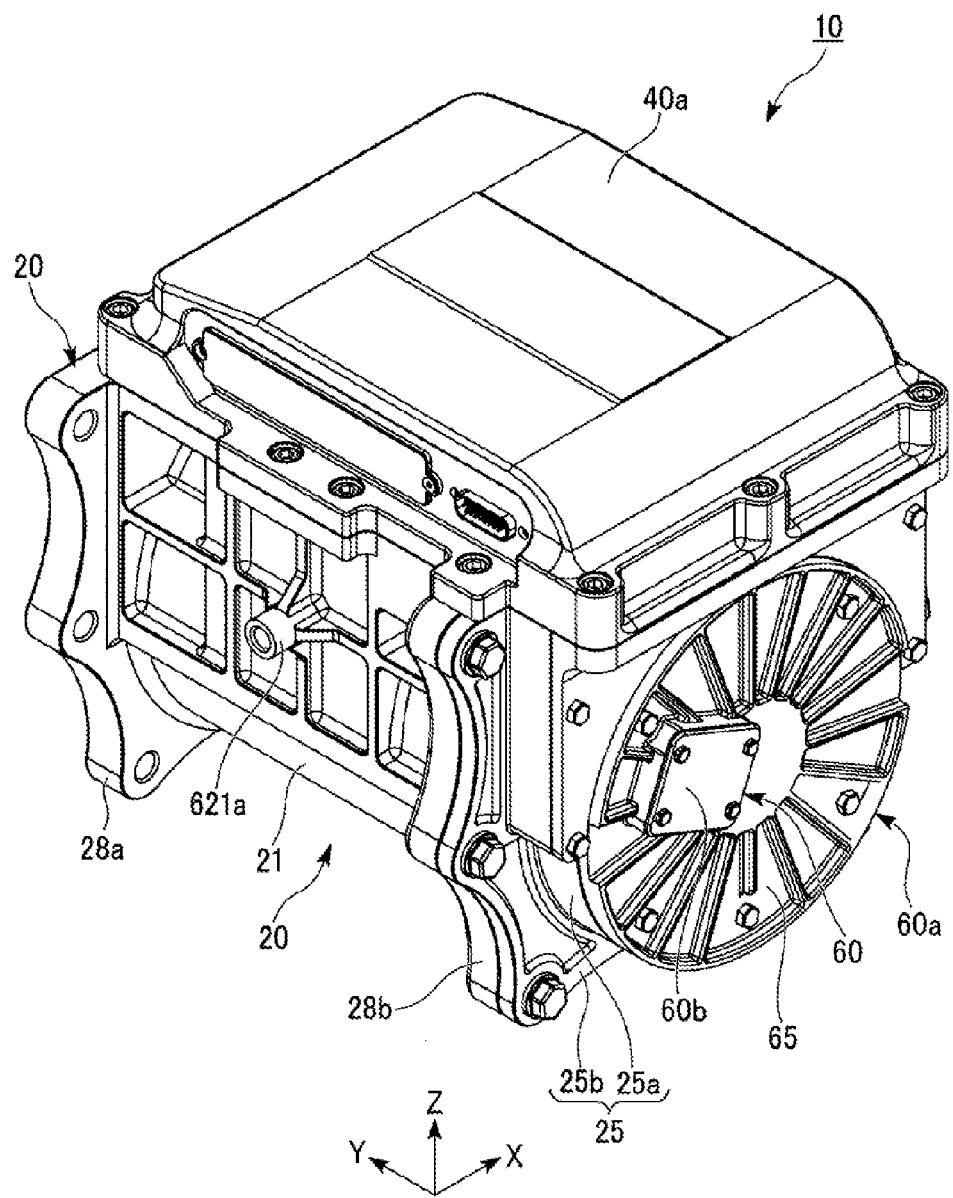
FIG. 1 is a perspective view showing a motor of a preferred embodiment.

In the following, with reference to the drawings, a motor according to a preferred embodiment of the present invention will be described.

The scope of the present invention is not limited to the following preferred embodiment, and the preferred embodiment can be modified arbitrarily within the scope of the technical concept of the present invention.

In the drawings to be referred to below, the scale, the number, etc., of components in the structure may be varied from those in the actual structure for clarification of the components.

Figure 2:
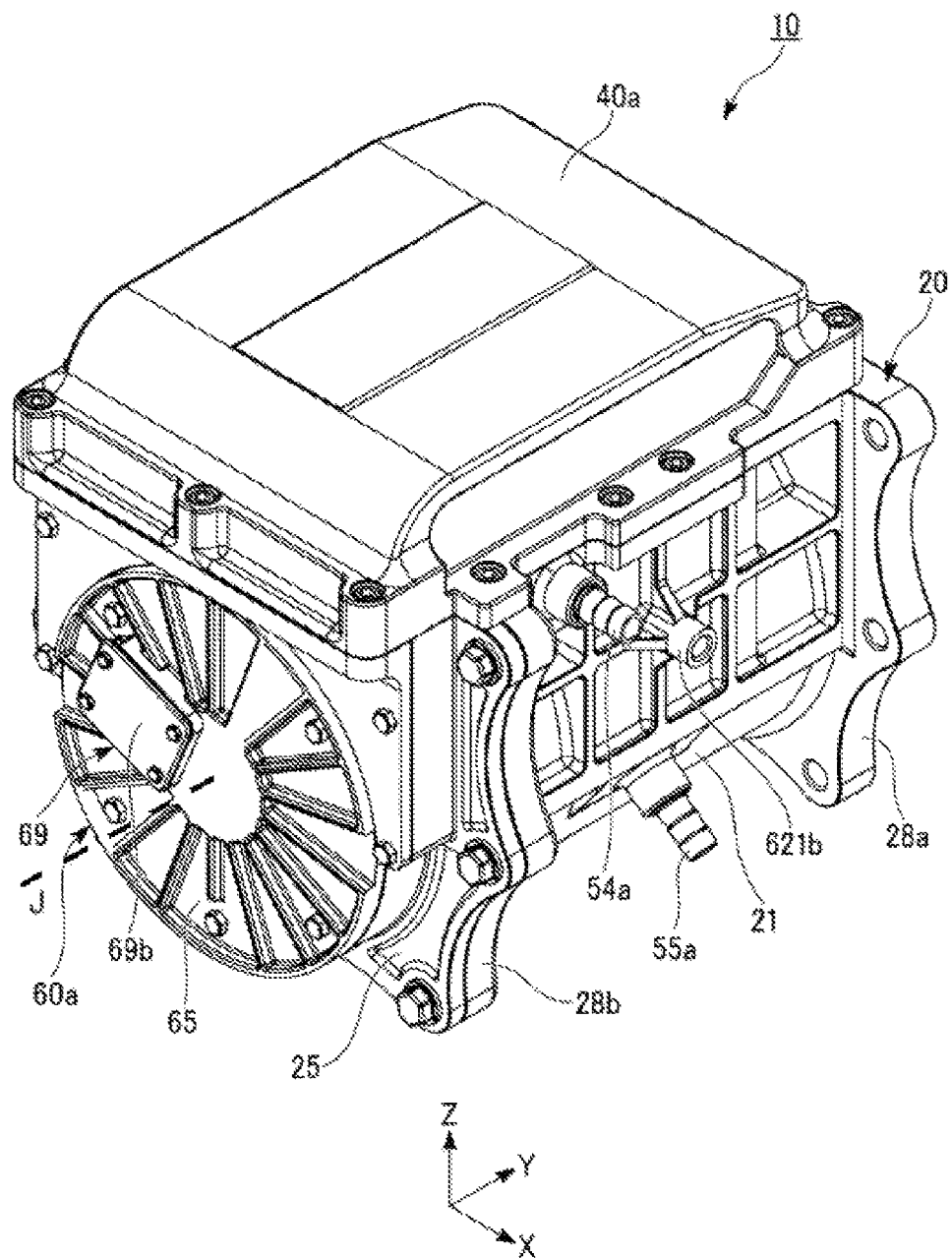
FIG. 2 is a perspective view showing the motor of the preferred embodiment.

In the drawings, an XYZ coordinate system is appropriately indicated as a three-dimensional orthogonal coordinate system, with the Z-axis direction being the vertical direction, the Y-axis direction being a direction parallel to the direction in which a central axis J shown in FIG. 2 extends (central axial direction), and the X-axis direction being a direction orthogonal to both of the Y-axis direction and the Z axis direction. In the following description, the positive side in the Y-axis direction (+Y side) will be referred to as the front side, and the negative side in the Y-axis direction (−Y side) will be referred to as the rear side. The directions around the central axis J will be referred to as a $\theta_Y$ direction and a $-\theta_Y$ direction. Unless otherwise noted, the radial direction in the following description means the radial direction of a rotating shaft 31. Unless otherwise noted, the circumferential direction in the following description means the circumferential direction of the rotating shaft 31.

Figure 3:
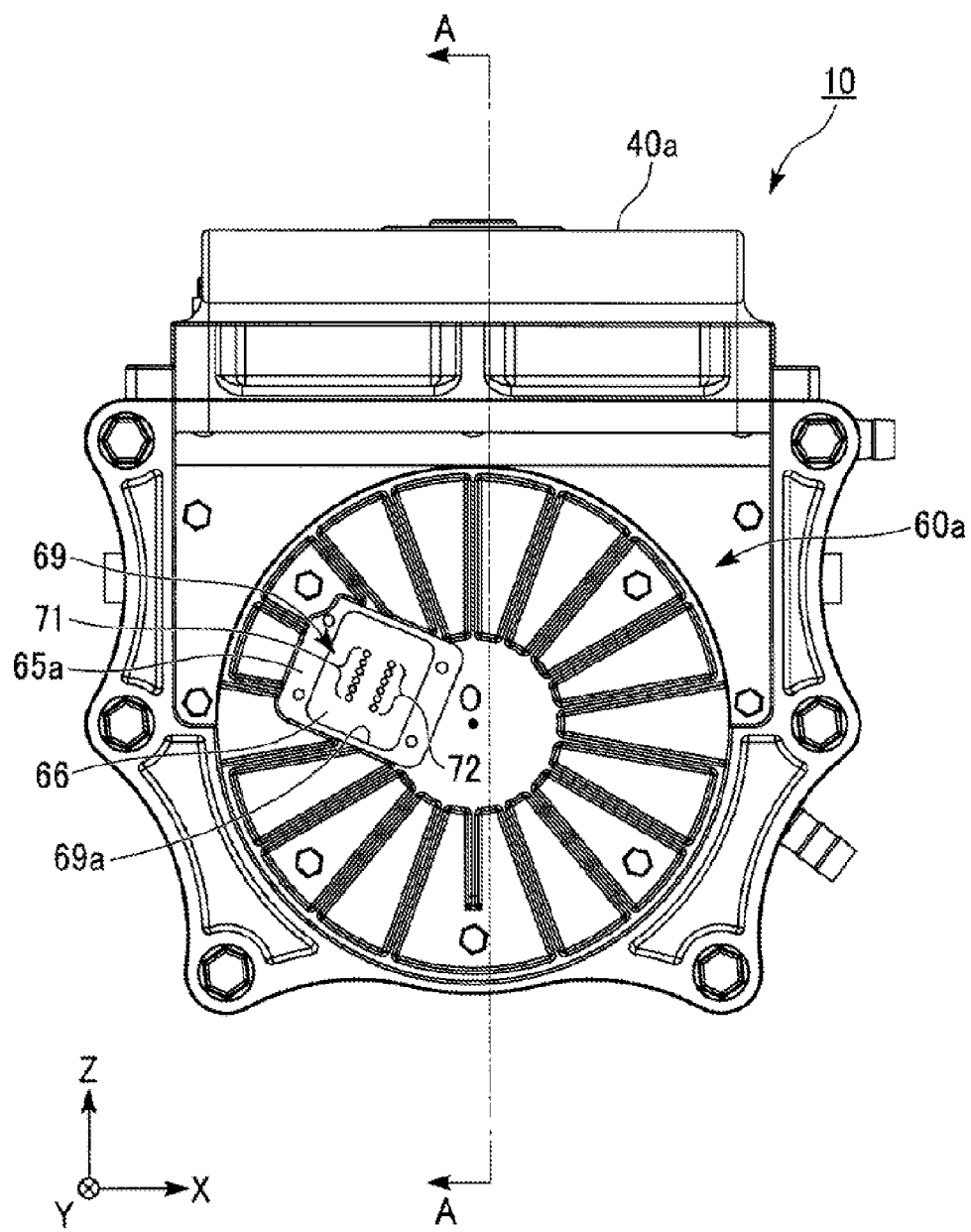
FIG. 3 is a side view of the motor of the preferred embodiment.
Figure 4:
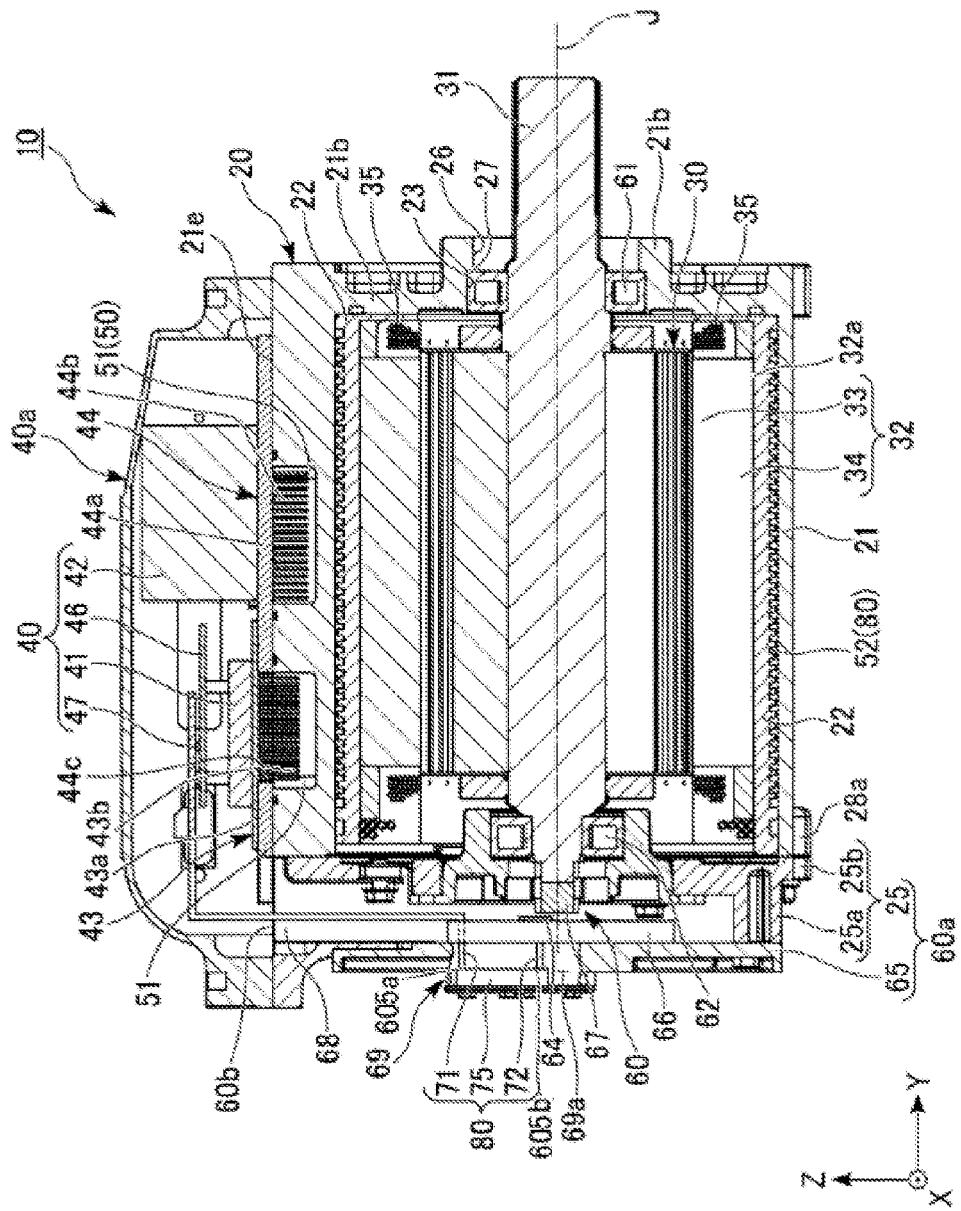
FIG. 4 is a cross-sectional view along the line A-A of FIG. 3.

FIG. 1 to FIG. 4 are views showing a motor 10 of this preferred embodiment. FIG. 1 and FIG. 2 are perspective views. FIG. 3 is a side view in the central axial direction. FIG. 4 is a cross-sectional view along the line A-A of FIG. 3.

The motor 10 of this preferred embodiment is a switched reluctance (SR) motor, for example. The motor 10 is a motor which is installed, for example, in an electric vehicle, a fuel-cell vehicle, or the like. As shown in FIG. 1 to FIG. 4, the motor 10 has a bracket 20, a control device housing part 40a mounted on the vertically upper-side surface (+Z side surface) of the bracket 20, and a sensor housing part 60a mounted on the rear-side (−Y side) end surface of the bracket 20.

The motor 10 includes the rotating shaft 31, a rotor 30, a stator 32, a front bearing 61, a rear bearing 62, and a control device 40.

The rotating shaft 31 is fixed in the rotor 30, and the rotor 30, the stator 32, the front bearing 61, and the rear bearing 62 are housed in the bracket 20. The front bearing 61 and the rear bearing 62 rotatably support the rotating shaft 31. The control device 40 is mounted on the bracket 20 and located inside the control device housing part 40a.

Bracket

The bracket 20 has a bracket main body part 21, base parts 28a, 28b, and a lid part 25. The bracket main body part 21 houses the rotor 30 and the stator 32. The base parts 28a, 28b are projecting radially from the end surfaces on the front side (+Y side) and the rear side (−Y side), respectively, of the bracket main body part 21. When the motor 10 is placed horizontally on a floor or a stand, the base parts 28a, 28b support the motor 10.

The lid part 25 has a tubular cylinder portion 25a extending in the axial direction, and a flange portion 25b extending radially outward from the front-side (+Y side) end of the cylinder portion 25a. The flange portion 25b is fixed on the base part 28b. A part of the flange portion 25b on the vertically lower side (−Z side), along with the base part 28b, serves as a leg part for supporting the motor 10. The lid part 25 is provided with a rear bearing retaining part 24. The rear bearing 62 is retained by the rear bearing retaining part 24.

The bracket main body part 21 is provided with various external member connection mechanisms. For example, bolt holes 621a, 621b for fastening a transport hook or a frame of a given device are provided on both side surfaces (+X side surface, −X side surface) of the bracket main body part 21. On one side surface (+X side surface) of the bracket main body part 21, an inflow-side connector 54a and an outflow-side connector 55a are provided. The inflow-side connector 54a and the outflow-side connector 55a are connected with a water pump (not shown).

The bracket main body part 21 has a bearing retaining portion 21b which retains the front bearing 61. The bearing retaining portion 21b has a front bearing retention hole 23, and an output shaft hole 26 provided on the front side (+Y side) of the front bearing retention hole 23. The front bearing retention hole 23 and the output shaft hole 26 communicate with each other, and the front bearing retention hole 23 and the output shaft hole 26 constitute a through-hole which penetrates the bearing retaining portion 21b in the central axial direction (Y-axis direction).

A step portion 27, of which the inner diameter increases from the front side (+Y side) toward the rear side (−Y side), is provided between the front bearing retention hole 23 and the output shaft hole 26. That is, the inner diameter of the front bearing retention hole 23 is larger than the inner diameter of the output shaft hole 26. The front bearing 61 is retained in the front bearing retention hole 23.

A circular cylindrical stator frame portion 22 is provided inside the bracket main body part 21. The stator frame portion 22 supports the stator 32. The stator frame portion 22 radially faces the bracket main body part 21 across a clearance on the radially inside of the bracket main body part 21.

The bracket 20 is provided with a cooling flow passage through which a cooling medium circulates, and the inflow-side connector 54a and the outflow-side connector 55a connected with the cooling flow passage 50. The cooling flow passage 50 includes a control device cooling flow passage 51 and a stator cooling flow passage 52. The cooling medium to be circulated through the cooling flow passage 50 is not particularly limited as far as it can cool the motor 10, and, for example, water can be selected as the cooling medium.

Rotating Shaft, Rotor, and Stator

As shown in FIG. 4, the rotating shaft 31 is centered at the central axis J. That is, the rotating shaft 31 extends in the central axial direction (Y-axis direction). The front-side (+Y side) end of the rotating shaft 31 is protruding from the bracket 20 through the output shaft hole 26 to be described later. The rotating shaft 31 is supported by the front bearing 61 and the rear bearing 62 so as to be rotatable around the axis (in the $\theta_Y$ direction and the $-\theta_Y$ direction).

The rotor 30 is fixed on the rotating shaft 31 while surrounding the rotating shaft 31 around the axis (in the $\theta_Y$ direction). More specifically, the rotor 30 has a through-hole (not shown) penetrating in the central axial direction (Y-axis direction). The rotating shaft 31 passes through the through-hole of the rotor 30. The inner surface of the through-hole of the rotor 30 retains the outer surface of the rotating shaft 31, for example, by press-fitting. Thus, the rotating shaft 31 is fitted in the rotor 30.

The stator 32 is located on the radially outside of the rotor 30. The stator 32 surrounds the rotor 30 around the axis (in the $\theta_Y$ direction). The stator 32 has a core back part 33, teeth parts 34, and a coil 35.

The core back part 33 has a circular cylindrical shape concentric with the rotating shaft 31. The radially outer surface of the core back part 33, that is, an outer surface 32a of the stator 32 is fitted on the radially inner surface of the stator frame portion 22.

The plurality of teeth parts 34 extend radially from the inner circumferential surface of the core back part 33 toward the rotating shaft 31. The plurality of teeth parts 34 are disposed on the inner circumferential surface of the core back part 33, at regular intervals in the circumferential direction. The coil 35 is formed by a conductive wire being wound around the teeth parts 34.

Control Device

As shown in FIG. 4, the control device 40 is mounted on the vertically upper side (+Z side) of the bracket main body part 21. The control device 40 adjusts power supplied from a power source (not shown) to the stator 32, and controls rotation of the rotor 30. The control device 40 has an inverter part 41, a capacitor part 42, a drive board 46, and a control board 47.

For example, the control board 47 controls a PWM signal (pulse width modulation signal) on the basis of a rotation command signal from a higher-level device in which the motor is installed, or of an input signal from the rotation sensor. The control board 47 controls rotation of the rotor 30. For example, the drive board 46 is a board on which an inverter drive circuit is mounted. On the basis of a control signal input from the control board 47, the inverter drive circuit generates a PWM signal to be supplied to the inverter part 41. While the drive board 46 and the control board 47 are shown as separate boards in the drawings, the drive board 46 and the control board 47 may be integrated into a single board.

While not shown, the inverter part 41 is composed of three inverter elements, for example. Examples of the inverter element include an SiC (silicon carbide) inverter element. The inverter element is not particularly limited, and a GaN (gallium nitride) inverter element, an insulated gate bipolar transistor (IGBT), a metal-oxide-semiconductor field-effect transistor (MOS-FET), or the like may be used.

The capacitor part 42 is mounted on the bracket main body part 21 through a capacitor cooling part 44. The capacitor cooling part 44 has a support plate 44a and cooling fins 44b located on the lower surface (−Z side surface) of the support plate 44a. The support plate 44a is a flat plate, and is fixed on an upper surface 21e of the bracket main body part 21. The capacitor part 42 is mounted on the upper surface of the support plate 44a. The position at which the capacitor part 42 is mounted on the support plate 44a is a position overlapping the cooling fin 44b when the support plate 44a is viewed in the direction orthogonal to the principal plane of the support plate 44a (Z-axis direction).

The plurality of cooling fins 44b are provided so as to protrude from the lower surface on the bracket main body part side (−Z side) of the support plate 44a. The plurality of cooling fins 44b are protruding from the support plate 44a toward the control device cooling flow passage 51 side (−Z side), and are disposed inside the control device cooling flow passage 51. The support plate 44a extends toward the rear side (−Y side) from a portion where the capacitor part 42 is supported. A through-hole 44c is provided at a position of the support plate 44a closer to the rear side.

The inverter part 41 is mounted on the inverter cooling part 43. The inverter cooling part 43 is mounted on the capacitor cooling part 44. That is, the inverter part 41 is mounted on the bracket main body part 21 through the inverter cooling part 43 and the capacitor cooling part 44.

The inverter cooling part 43 has a support plate 43a and a cooling fin 43b located on the lower surface (−Z side surface) of the support plate 43a. The support plate 43a has a flat plate shape. The support plate 43a is fixed on the upper surface of the support plate 44a of the capacitor cooling part 44.

In the upper surface of the support plate 43a, the position at which the inverter part 41 is mounted is a position overlapping the cooling fin 43b when the support plate 43a is viewed in the direction orthogonal to the principal plane of the support plate 43a (Z-axis direction). The cooling fin 43b is disposed inside the control device cooling flow passage 51 through the through-hole 44c of the support plate 44a.

Control Device Housing Part, Sensor Housing Part

As shown in FIG. 1 to FIG. 4, the control device housing part 40a is a cover member having a box shape with the lower side (−Z side) open. The control device housing part 40a surrounds the upper surface and the side surfaces of the control device 40 mounted on the vertically upper side (+Z side) of the bracket main body part 21. The control device housing part 40a is projecting further toward the rear side (−Y side) than the inverter part 41 of the control device 40, and extends to the vertically upper side of the sensor housing part 60a.

The sensor housing part 60a is a hollow case provided on the rear side (−Y side) of the bracket main body part 21. The sensor housing part 60a has the lid part 25 of the bracket 20, and a sensor cover 65 mounted on the rear side (−Y side) of the lid part 25. The sensor housing part 60a has a port 69 provided in the sensor cover 65.

The sensor housing part 60a has an opening 60b opened on the vertically upper side (+Z side). The internal space of the sensor housing part 60a and the internal space of the control device housing part 40a communicate with each other through the opening 60b. The internal space of the sensor housing part 60a is at least the space which is covered by the lid part 25 and the sensor cover 65. The internal space of the control device housing part 40a is at least the space which is covered by the bracket main body part 21 and the control device housing part 40a. A wire is disposed in a communication part where the sensor housing part 60a and the control device housing part 40a communicate with each other.

A motor sensor 60 which detects rotation of the rotor is housed in the internal space of the sensor housing part 60a. The motor sensor 60 has a permanent magnet 67 mounted at the rear-side end of the rotating shaft 31, a Hall element 64 facing the permanent magnet 67, and a sensor circuit board 66 on which the Hall element 64 is mounted.

The sensor circuit board 66 is supported on the inner surface (+Y side surface) of the sensor cover 65. The Hall element 64 is mounted on the front side (+Y side surface) of the sensor circuit board 66. The Hall element 64 faces the permanent magnet 67 in the axial direction. The permanent magnet 67 is magnetized radially or magnetized multipolarly on a single side. It is not absolutely necessary to mount the Hall element 64 on the front side of the sensor circuit board 66. It is only necessary that the Hall element 64 can read changes in magnetic field of the permanent magnet 67. The Hall element 64 may be mounted on the rear side (−Y side surface) of the sensor circuit board 66.

On the sensor circuit board 66, a first connector 71 and a second connector 72 composed of a plurality of pins each protruding from the rear-side (−Y side) surface toward the rear side are mounted. The first connector 71 is a terminal electrically connected with the control board 47. The second connector 72 is a terminal electrically connected with the Hall element 64. That is, the second connector 72 is connected with a motor sensor. The bridge connector 75 is mounted on the first connector 71 and the second connector 72.

The sensor circuit board 66 is electrically connected with the control board 47 through a wire 68. The wire 68 extending from the sensor circuit board 66 extends into the control device housing part 40a through the opening 60b of the sensor housing part 60a. Inside the control device housing part 40a, the wire 68 is electrically connected with the control board 47.

The first connector 71 is electrically connected with the wire 68. In the case of this preferred embodiment, a leading end portion of the wire 68 constitutes the first connector 71. The wire 68 penetrates the sensor circuit board 66 from the front side (+Y side) to the rear side (−Y side) and is fixed on the sensor circuit board 66. The leading end portion of the wire 68 protruding from the rear-side surface of the sensor circuit board 66 constitutes the first connector 71.

The first connector 71 and the wire 68 may be composed of different members. For example, the first connector 71 is a connector part mounted on the sensor circuit board 66. This connector part and the wire 68 may be electrically connected with each other. The connector part and the wire 68 may be connected with each other directly or through a printed wire on the sensor circuit board 66.

The first connector 71 does not have to be mounted on the sensor circuit board 66. For example, the leading end of the wire 68, or the connector part mounted at the leading end of the wire 68 may be disposed at a position overlapping the port 69 in the axial direction.

As shown in FIG. 1 to FIG. 3, the port 69 includes an opening 69a penetrating the sensor cover 65 in the axial direction, and a connector cover 69b closing the opening 69a. The connector cover 69b is removable. In the case of this preferred embodiment, both the opening 69a and the connector cover 69b have a radially long and substantially rectangular shape, and are disposed in an oblique direction relative to the horizontal direction (X-axis direction).

In the case of this preferred embodiment, a rectangular frame part 65a protruding toward the rear side (−Y side) is provided on the outer surface (−Y side surface) of the sensor cover 65, and the opening 69a is provided inside the frame part 65*a*. The connector cover 69*b* is mounted at the rear-side (−Y side) end of the frame part 65*a*. Thus, the port 69 is a protruding portion protruding toward the rear side in the sensor cover 65.

As shown in FIG. 4, a coupling connector 80 is disposed inside the port 69. In FIG. 4, the internal structure of the port 69 is shown in a part of the cross-sectional view of the sensor cover 65. The coupling connector 80 includes the first connector 71 and the second connector 72 of the sensor circuit board 66, and the bridge connector 75 attached on/detached from the first connector 71 and the second connector 72. The bridge connector 75 electrically connects the first connector 71 and the second connector 72 with each other.

As shown in FIG. 3 and FIG. 4, a part of the sensor circuit board 66 is located inside the opening 69*a*. Specifically, a region of the sensor circuit board 66, where the first connector 71 and the second connector 72 are disposed, is disposed so as to overlap the opening 69*a* in the axial direction. That is, the second connector 72 is mounted on the sensor circuit board 66. At least a part of the second connector 72 overlaps the port 69 in the axial direction. The first connector 71 and the second connector 72 are mounted on the sensor circuit board 66, and the first connector 71 and the second connector 72 may be disposed so as to overlap the port 69 in the axial direction.

The bridge connector 75 has a first terminal connected with the first connector 71 and a second terminal connected with the second connector 72. The bridge connector 75 has at least a function of short-circuiting the first connector 71 and the second connector 72. For example, the bridge connector 75 may be a connector including an electric circuit, such as a noise removing circuit. The bridge connector 75 is housed inside the connector cover 69*b* while being connected with the first connector 71 and the second connector 72.

As shown in FIG. 3, the port 69 is disposed at a position shifted toward the upper side (+Z side) relative to a center O of the rotating shaft 31. Accordingly, the coupling connector 80 disposed inside the port 69 is disposed on the side closer to the control device 40 from the center O1 of the rotating shaft 31. Thus, the wire 68 connecting the coupling connector 80 and the control device 40 with each other can be shortened, so that disturbance noise to the wire 68 can be reduced.

As shown in FIG. 3 and FIG. 4, the first connector 71 connected with the control device 40 is disposed further on the upper side (+Z side) inside the port 69 than the second connector 72 connected with the motor sensor 60. This configuration allows shortening of the wire 68 connecting the control device 40 and the first connector 71 with each other. As a result, the influence of disturbance noise on the wire 68 can be reduced.

In the motor 10 of this preferred embodiment having been described above, the port 69 is provided on the rear-side surface (−Y side surface) of the sensor housing part 60*a*, and the coupling connector 80 is disposed inside the port 69. According to this configuration, a worker etc. can expose the terminals of the first connector 71 and the second connector 72 during maintenance work by removing the connector cover 69*b* and then removing the bridge connector 75. Thus, the worker etc. can connect an inspection device etc. with the first connector 71 or the second connector 72 by a simple operation. As a result, the worker etc. can efficiently perform maintenance work for checking, for example, whether the control device 40 or the motor sensor 60 outputs normally.

In this preferred embodiment, the port 69 is disposed at the end of the motor 10 in the axial direction. This configuration allows shortening of the wire from the motor sensor 60 to the port 69. In this preferred embodiment, the sensor circuit board 66 of the motor sensor 60 is disposed at a position overlapping the opening 69*a* of the port 69 in the axial direction, and the coupling connector 80 and the Hall element 64 are mounted on a common board. Thus, the wire length from the motor sensor 60 to the coupling connector 80 is reduced, so that the influence of disturbance noise on the motor sensor 60 is suppressed. As a result, rotation of the motor can be controlled with high accuracy.

In this preferred embodiment, the coupling connector 80 is housed inside the port 69, and the motor sensor 60 and the control device 40 are connected with each other inside the motor 10. That is, in this configuration, the wire and the connectors for internal connection of the motor 10 are not exposed to the outside. This configuration makes the wire for sending/receiving signals insusceptible to disturbance noise. Accordingly, there is less limitation on arrangement of the motor in a higher-level device in which the motor is installed.

The configuration of the motor 10 of this preferred embodiment is suitable to an SR motor. The SR motor is preferably used for a device for which high-speed rotation is desired. Or the SR motor is used as a driving main motor. In the case of a driving main motor, the motor output is large. In device applications where such high-speed rotation and high current of the motor are desired, high-frequency noise is likely to occur due to the necessity of switching a high current at a high speed in the inverter. In this regard, the motor 10 of this preferred embodiment has a configuration in which the motor sensor 60 is insusceptible to disturbance noise. It is therefore possible to suppress degradation of sensor accuracy even in a case where an SR motor is driven in a high-speed rotation region where high-frequency noise is likely to occur.

In the motor 10 of this preferred embodiment, the various external member connection mechanisms (the bolt holes 621*a*, 621*b*, the inflow-side connector 54*a*, and the outflow-side connector 55*a*) are provided on the side surface of the bracket main body part 21. The base parts 28*a*, 28*b* are provided at both ends in the axial direction of the bracket main body part 21. Here, given a configuration where a maintenance port is provided in the circumferential surface of the motor 10, the above external member connection mechanisms would get in the way of a worker etc. and make work difficult. By contrast, in the motor 10 of this preferred embodiment, since the port 69 is provided on the end surface in the axial direction of the motor 10, the above external member connection mechanisms do not get in the way of a worker etc.

In this preferred embodiment, the configuration is adopted where the entire coupling connector 80 (the first connector 71, the second connector 72, and the bridge connector 75) is disposed inside the port 69. However, it is only necessary that the connection part of the coupling connector 80 is disposed at a position overlapping at least the port 69 in the axial direction. That is, a part of the first connector 71 or the second connector 72 may extend to the outside of the port 69.

The specific configuration of the coupling connector shown in this preferred embodiment is one example. Various shapes can be adopted as the connector shape of the first connector 71, the second connector 72, and the bridge connector 75, for example, according to the number of wires which connect the motor sensor 60 and the control device 40 with each other.

In this preferred embodiment, the bridge connector 75 is used to connect the first connector 71 and the second connector 72 with each other. However, the first connector 71 and the second connector 72 may be directly connected with each other. In this case, a connector part is used for the first connector 71 and the second connector 72 which is connected with these connectors. When the first connector 71 and the second connector 72 are directly connected with each other as well, the connection part of the connectors is disposed inside the port 69.

FIRST MODIFIED EXAMPLE

The first modified example is different from the above preferred embodiment in the aspect of arrangement of the Hall element and the permanent magnet. Description of the same components as in the above preferred embodiment may be omitted by appropriately giving them the same reference signs.

Figure 5:
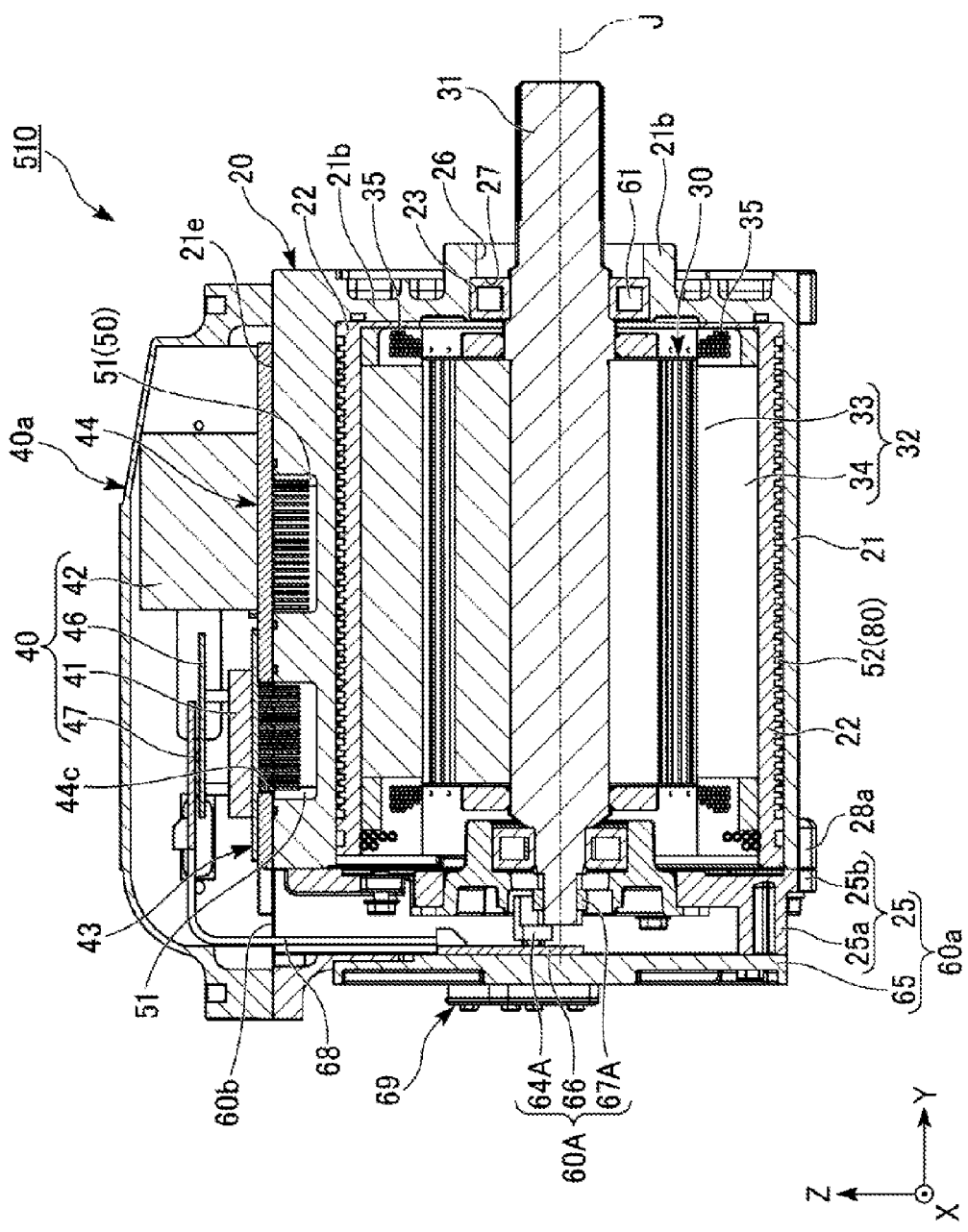
FIG. 5 is a cross-sectional view of a motor of a first modified example.

FIG. 5 is a cross-sectional view showing a motor 510 of the first modified example. As shown in FIG. 5, the motor 510 has a motor sensor 60A at the rear-side (−Y side) end of the rotating shaft 31. The motor sensor 60A has a ring-shaped permanent magnet 67A mounted on the circumferential surface of the end of the rotating shaft 31, a Hall element 64A radially facing the permanent magnet 67A, and the sensor circuit board 66 on which the Hall element 64A is mounted. The permanent magnet 67A is magnetized so that the magnetic pole changes in the circumferential direction.

While not shown in FIG. 5, the first connector 71 and the second connector 72 are provided on the rear-side (−Y side) surface of the sensor circuit board 66. The bridge connector 75 is connected with the first connector 71 and the second connector 72. The bridge connector 75 is housed inside the port 69.

In the motor 510 of the first modified example including the above configuration, rotation of the rotor 30 can be detected by the motor sensor 60A which includes the Hall element 64A radially facing the permanent magnet 67A. In the motor 510 of the first modified example, the effects based on the configuration which it has in common with the motor 10 of the above preferred embodiment can be obtained as with the motor 10.

SECOND MODIFIED EXAMPLE

The second modified example is different from the above preferred embodiment in the type of motor sensor. Description of the same components as in the above preferred embodiment may be omitted by appropriately giving them the same reference signs.

Figure 6:
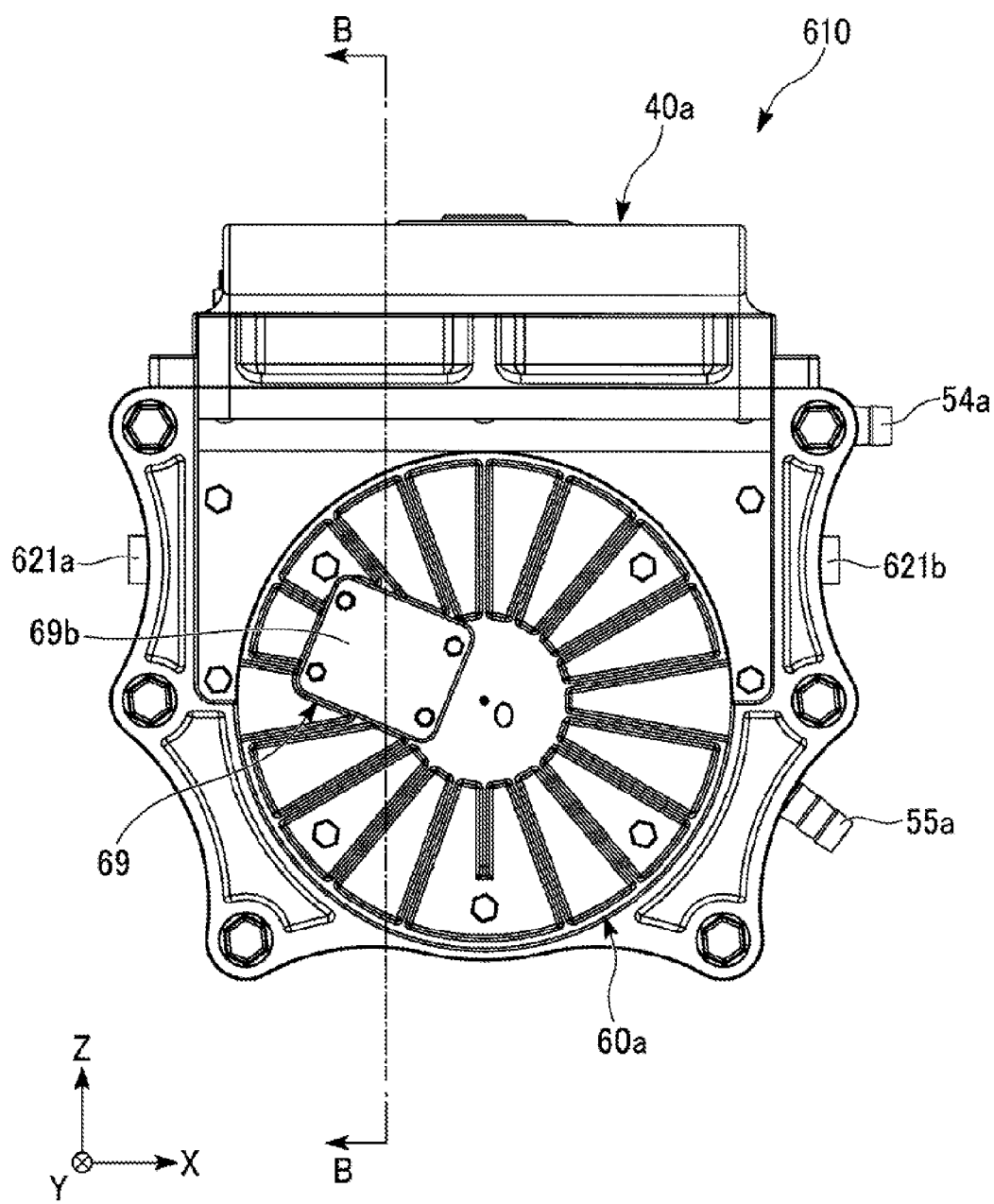
FIG. 6 is a side view of a motor of a second modified example.
Figure 7:
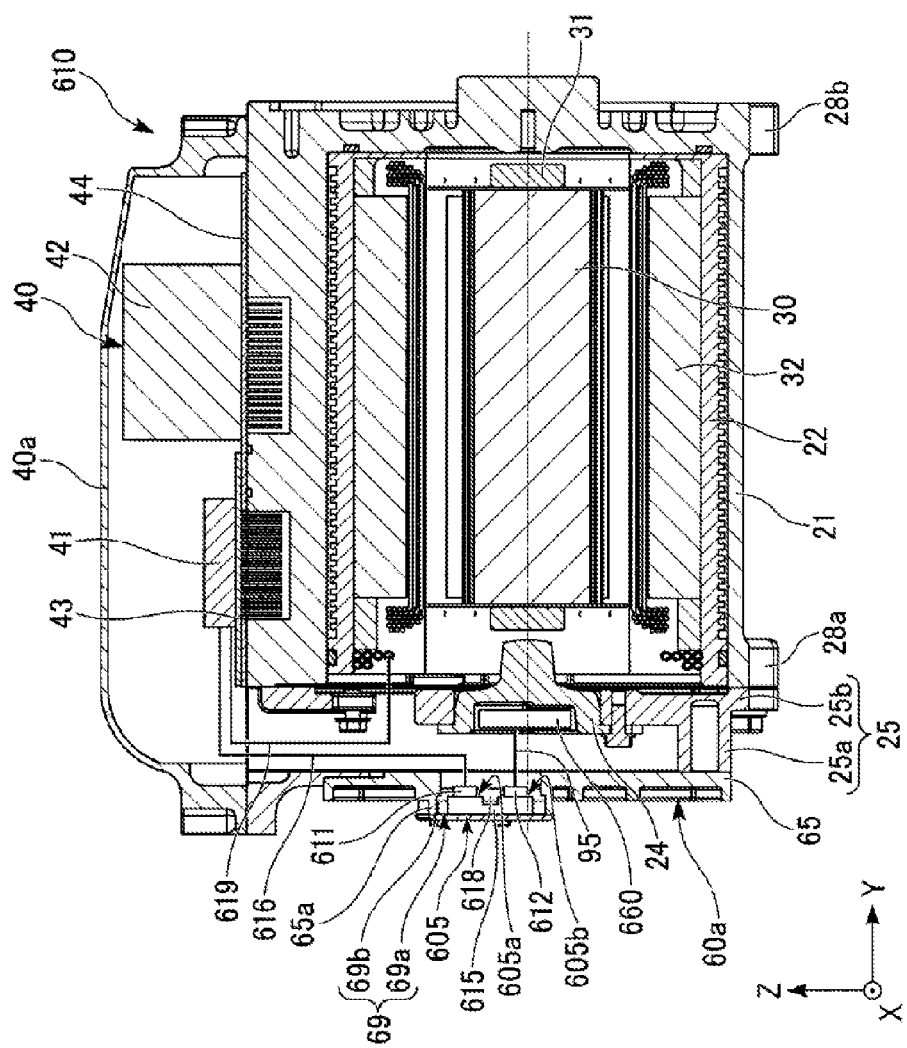
FIG. 7 is a cross-sectional view along the line B-B of FIG. 6.
Figure 8:
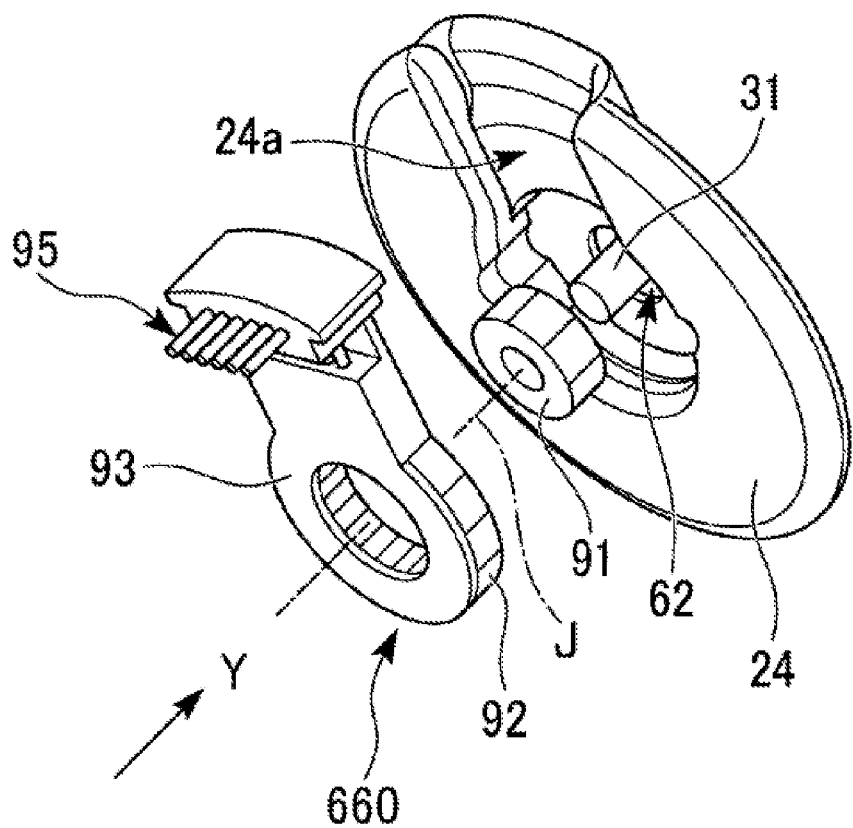
FIG. 8 is a perspective view showing one example of a motor sensor.
Figure 9:
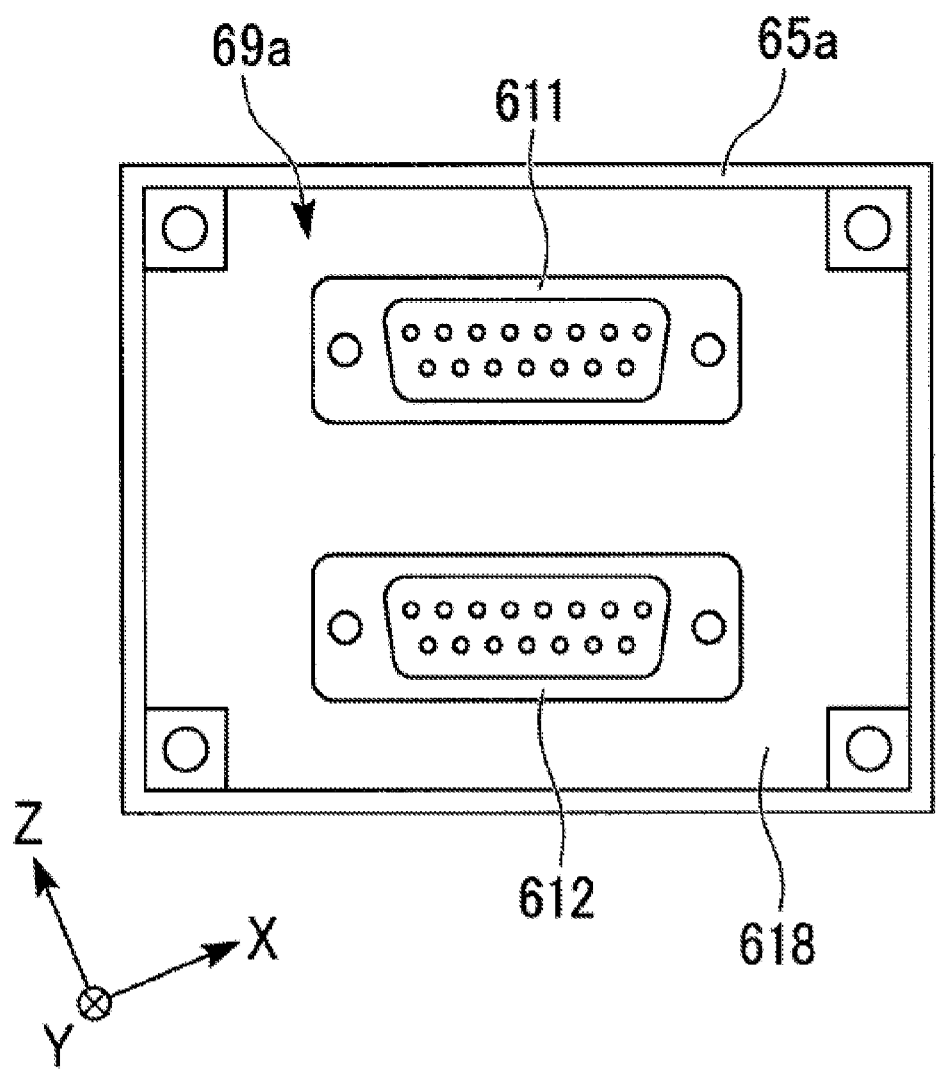
FIG. 9 is a plan view of a port.

FIG. 6 is a side view of a motor of the second modified example. FIG. 7 is a cross-sectional view along the line B-B of FIG. 6. FIG. 8 is a perspective view showing one example of a motor sensor in the second modified example. FIG. 9 is a plan view of a port in the second modified example.

A motor 610 of the second modified example has a motor sensor 660 housed in the sensor housing part 60a. In the second modified example, the motor sensor 660 is a resolver. As shown in FIG. 8, the motor sensor 660 has a rotary part 91, a stationary part 92, an insulator 93, and a wire 95. The motor sensor 660 is fixed by being fitted in a recessed portion 24a of the rear bearing retaining part 24.

The rotary part 91 is a ring-shaped member. The rotary part 91 is press-fitted in a base end portion of the rotating shaft 31 which is protruding outward (rearward) from the rear bearing 62 retained by the rear bearing retaining part 24. The stationary part 92 is a circular cylindrical member disposed around the rotary part 91 with a slight clearance. The stationary part 92 is provided integrally with the insulator 93. The insulator 93 is a resin member and supports the stationary part 92. The plurality of wires 95 are connected to the stationary part 92. The wires 95 extend toward the rear side from the rear-side (−Y side) surface of the insulator 93. The stationary part 92 outputs an electric signal according to rotation of the rotary part 91. The electric signal output is sent to an external device through the wires 95.

A wire 616 and a wire 619 are disposed in the internal space of the sensor housing part 60a and the internal space of the control device housing part 40a. The wire 616 is a wire connecting the control device 40 and the motor sensor 660 with each other. The wire 619 is a wire connecting the control device 40 and the stator 32 with each other. The wire 619 is a wire through which power is supplied from the control device 40 to the coil of the stator 32.

A coupling connector 605 is disposed inside the port 69. The coupling connector 605 includes a first connector 611, a second connector 612, and a bridge connector 615. The first connector 611 is connected with the control device 40 through the wire 616. The second connector 612 is connected with the motor sensor 660 through the wire 95. The bridge connector 615 is connected with the first connector 611 and the second connector 612, and electrically connects the first connector 611 and the second connector 612 with each other.

Figure 10:
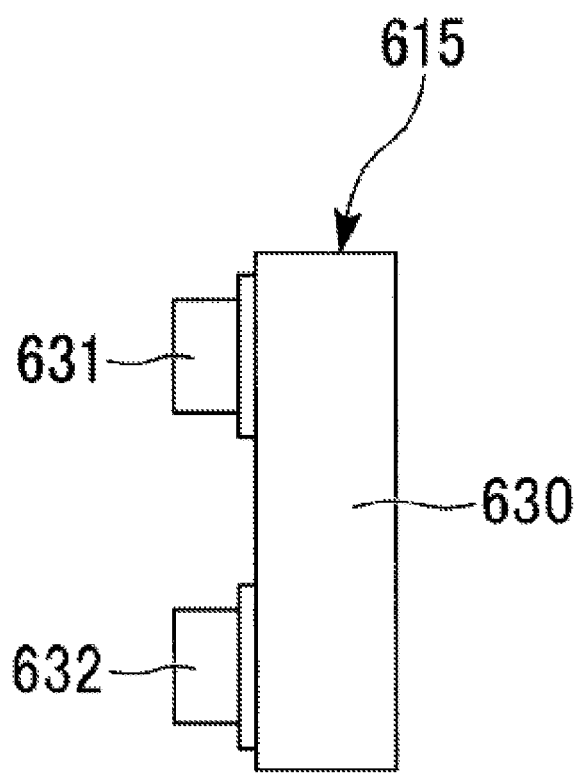
FIG. 10 is a side view of a bridge connector.

FIG. 9 is a plan view of the port 69. FIG. 10 is a side view of the bridge connector 615. FIG. 9 shows a planar configuration of the inside of the port 69 with the connector cover 69b removed.

As shown in FIG. 7 and FIG. 9, a connector board 618 fixed on the inner circumferential surface of the frame part 65a is disposed in the opening 69a of the port 69. The first connector 611 and the second connector 612 are fixed on the connector board 618. In the case of this preferred embodiment, the first connector 611 and the second connector 612 are disposed side by side in the same direction at a predetermined interval, in a direction in which the surface of the connector board 618 on which electronic components are mounted spreads.

As shown in FIG. 10, the bridge connector 615 has a main body part 630, and a first terminal 631 and a second terminal 632 provided on one side of the main body part 630. The first terminal 631 is a terminal connected with the first connector 611. The second terminal 632 is a terminal connected with the second connector 612. The first terminal 631 and the second terminal 632 are disposed in a predetermined positional relation corresponding to the first connector 611 and the second connector 612 on the connector board 618.

The bridge connector 615 is connected with the first connector 611 and the second connector 612 at the same time. The bridge connector 615 can be housed inside the connector cover 69b while being connected with the first connector 611 and the second connector 612. The bridge connector 615 has at least a function of short-circuiting the first connector 611 and the second connector 612. The bridge connector 615 may be a connector including an electric circuit, such as a noise removing circuit.

As shown in FIG. 7, the port 69 is provided at a position overlapping the motor sensor 660 in the axial direction. The wire 95 connecting the stationary part 92 of the motor sensor 660 and the second connector 612 with each other extends from the stationary part 92 in the axial direction, and is connected with the second connector 612. As a result of this configuration, the coupling connector 605 is disposed in the vicinity of the motor sensor 660. Here, the wire 619 transmits a high current from the control device 40 to the stator 32. Accordingly, since the wire 95 is disposed at a distance from the wire 619, the wire 95 is insusceptible to radiation noise from the wire 619.

Since the port 69 and the stationary part 92 of the motor sensor 660 are disposed so as to overlap with each other in the axial direction, a worker etc. can visually check the stationary part 92 from the port 69. This configuration allows the worker etc. to perform maintenance work of the motor sensor 660 through the port 69.

In this example, the entire coupling connector 605 (the first connector 611, the second connector 612, and the bridge connector 615) is disposed inside the port 69. However, it is only necessary that connection parts 605a, 605b of the coupling connector 605 are disposed at positions overlapping at least the port 69 in the axial direction. That is, a part of the first connector 611 or the second connector 612 may extend to the outside of the port 69.

The specific configuration of the coupling connector 605 shown in this example is one example. Various shapes can be adopted for the connector shape of the first connector 611, the second connector 612, and the bridge connector 615, for example, according to the number of wires which connect the motor sensor 660 and the control device 40 with each other.

In this preferred embodiment, the bridge connector 615 is used to connect the first connector 611 and the second connector 612 with each other. However, the first connector 611 and the second connector 612 may be directly connected with each other. In this case as well, the connection part of the first connector 611 and the second connector 612 is disposed inside the port.

In the motor 610 of the second modified example as well, the effects based on the configuration which it has in common with the motor 10 of the above preferred embodiment can be obtained as with the motor 10.

While the SR motor is used as one example in the preferred embodiment and the modified examples described above, the motor is not limited to an SR motor. For example, the motor of the present invention is also applicable to any publicly-known inner rotor-type motor. The applications of the motor of the present invention are not particularly limited.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a rotating shaft extending in a central axial direction and having one end serving as an output end;
a rotor in which the rotating shaft is fixed;
a stator located on the radially outside of the rotor;
a bracket housing the rotor and the stator;
a control device housing part located on the radially outside of the bracket;
a control device located inside the control device housing part;
a sensor housing part located at an end of the bracket on a side opposite to the output end;
a motor sensor mounted at an end of the rotating shaft on the side opposite to the output end; and
a coupling connector connecting the motor sensor and the control device with each other, wherein
an internal space of the control device housing part and an internal space of the sensor housing part communicate with each other,
the coupling connector is located inside the sensor housing part, and
the sensor housing part has a port which has an opening in the axial direction, and the port and the coupling connector at least partially overlap with each other in the axial direction.

2. The motor according to claim 1, wherein the motor sensor includes a magnet mounted on the rotating shaft, a Hall element facing the magnet, and a sensor circuit board on which the Hall element is mounted.

3. The motor according to claim 2, wherein the coupling connector includes a first connector connected with the control device, a second connector connected with the motor sensor, and a bridge connector connecting the first connector and the second connector with each other.

4. The motor according to claim 3, wherein the second connector is mounted on the sensor circuit board, and at least a part of the second connector overlaps the port in the axial direction.

5. The motor according to claim 3, wherein the first connector and the second connector are mounted on the sensor circuit board, and the first connector and the second connector overlap the port in the axial direction.

6. The motor according to claim 3, wherein the port overlaps the first connector and the second connector in the axial direction, and the first connector is disposed closer to the control device than the second connector is.

7. The motor according to claim 1, wherein the motor sensor is a resolver.

8. The motor according to claim 7, wherein the coupling connector includes a first connector connected with the control device, a second connector connected with the motor sensor, and a bridge connector connecting the first connector and the second connector with each other.

9. The motor according to claim 8, wherein the second connector is connected with a wire extending in the axial direction from a stationary part of the resolver.

10. The motor according to claim 7, wherein a connection part of the coupling connector overlaps at least a part of the resolver in the axial direction.

11. The motor according to any one of claims 7, wherein the port overlaps at least a part of the resolver in the axial direction.

12. The motor according to claim 11, wherein the port overlaps at least a part of the stationary part of the resolver in the axial direction.

13. The motor according to claim 8, wherein the port overlaps the first connector and the second connector in the axial direction, and the first connector is disposed closer to the control device than the second connector is.

14. The motor according to claim 1, wherein, in the radial direction from the rotating shaft toward the control device, the port is disposed further on the control device side than the rotating shaft.

15. The motor according to claim 1, wherein the bracket has a bracket main body part housing the rotor and the stator, and two base parts protruding from both ends in the axial direction of the bracket main body part toward the side opposite to the control device housing part, and an external member connection mechanism connected with an external member is provided on the outer periphery of the bracket main body part.

16. The motor according to claim 1, wherein the motor comprises a switched reluctance motor.

* * * * *